US012195652B2

(12) United States Patent
Khurana et al.

(10) Patent No.: US 12,195,652 B2
(45) Date of Patent: Jan. 14, 2025

(54) BACKING FOR ADHESIVE TAPE WITH THERMAL RESISTANCE (71) Applicant: 3M INNOVATIVE PROPERTIES COMPANY, St. Paul, MN (US)

(72) Inventors: Rachna Khurana, Woodbury, MN (US); Christopher J. Rother, Hudson, WI (US); Jeffrey O. Emslander, City of Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/521,324

(22) Filed: Nov. 8, 2021

(65) Prior Publication Data

US 2022/0056318 A1 Feb. 24, 2022

Related U.S. Application Data (62) Division of application No. 16/042,192, filed on Jul. 23, 2018, now abandoned.

(60) Provisional application No. 62/537,042, filed on Jul. 26, 2017.

(51) Int. Cl.
C09J 7/38 (2018.01)
B29C 48/10 (2019.01)
B29C 48/18 (2019.01)
B29C 48/21 (2019.01)
C09J 7/24 (2018.01)
C09J 7/29 (2018.01)
B29C 48/88 (2019.01)
B32B 27/30 (2006.01)
C09J 7/22 (2018.01)

(52) U.S. Cl.
CPC ............... C09J 7/38 (2018.01); B29C 48/10 (2019.02); B29C 48/185 (2019.02); B29C 48/21 (2019.02); C09J 7/243 (2018.01); C09J 7/29 (2018.01); B29C 48/9175 (2019.02); B32B 27/302 (2013.01); B32B 2405/00 (2013.01); C09J 7/22 (2018.01); C09J 7/241 (2018.01); C09J 2301/162 (2020.08); C09J 2301/302 (2020.08); C09J 2301/312 (2020.08); C09J 2301/414 (2020.08); C09J 2423/046 (2013.01); C09J 2423/106 (2013.01); C09J 2431/006 (2013.01); C09J 2433/006 (2013.01); Y10T 428/28 (2015.01); Y10T 428/2848 (2015.01)

(58) Field of Classification Search
None
See application file for complete search history.

(56) References Cited

U.S. PATENT DOCUMENTS

| | | |
|---|---|---|
| 2,925,174 A | 2/1960 | Stow |
| 3,089,786 A | 5/1963 | Nachtsheim |
| 3,092,250 A | 6/1963 | Knutson |
| 3,290,206 A | 12/1966 | Johnson |
| 3,406,820 A | 10/1968 | Bond |
| 3,769,071 A | 10/1973 | Trancik |
| RE29,663 E | 6/1978 | Theissen |
| 4,271,223 A | 6/1981 | Lambert |
| 4,769,024 A | 9/1988 | Pike |
| 4,895,738 A | 1/1990 | Zimmerman |
| 5,087,494 A | 2/1992 | Calhoun |
| 5,405,692 A | 4/1995 | Weng |
| 5,677,376 A | 10/1997 | Groves |
| 5,925,459 A | 7/1999 | Zimmerman |
| 6,106,982 A * | 8/2000 | Mientus ............... G03G 7/004 430/14 |
| 6,174,578 B1 | 1/2001 | Holley |
| 6,294,249 B1 | 9/2001 | Hamer |
| 6,400,989 B1 | 6/2002 | Eckmiller |
| 6,506,447 B1 | 1/2003 | Hirsch |
| 6,565,703 B2 | 5/2003 | Wenninger |
| 6,908,672 B2 | 6/2005 | Wenninger |
| 7,029,905 B1 | 4/2006 | Sippel |
| 7,045,173 B2 | 5/2006 | Hirsch |
| 7,294,396 B2 | 11/2007 | Galle |
| 7,595,104 B2 | 9/2009 | Romanowski |
| 7,622,159 B2 | 11/2009 | Mertz |
| 7,767,224 B2 | 8/2010 | Kummer |
| 8,652,376 B2 | 2/2014 | Burmeister |
| 8,828,535 B2 | 9/2014 | Tokunaga |
| 8,992,714 B2 | 3/2015 | Tach |
| D746,265 S | 12/2015 | Colby |
| 9,328,263 B2 | 5/2016 | Tach |
| 9,593,263 B2 | 3/2017 | Keite-Telgenbuscher |
| 9,604,753 B2 | 3/2017 | Krause |
| 9,714,366 B2 | 7/2017 | Luhmann |
| 2003/0056891 A1 | 3/2003 | Schroder |
| 2004/0095244 A1 | 5/2004 | Conwell |
| 2005/0069721 A1 | 3/2005 | Biasoli |

(Continued)

FOREIGN PATENT DOCUMENTS

| | | |
|---|---|---|
| CA | 2159276 | 3/1996 |
| CA | 2790710 | 4/2013 |

(Continued)

Primary Examiner — Anish P Desai
(74) Attorney, Agent, or Firm — Katherine M. Scholz (57) ABSTRACT Backing films for adhesive tapes are presented, as well as adhesive tapes comprising such backing films, which may include tapes used in construction such as seam sealing tapes, roofing tapes, and flashing tapes. The backing film comprises a core layer, a first skin layer, and optionally a second skin layer, where the backing film has a coefficient of thermal expansion of less than 90 ppm/° C. measured in at least one direction within the plane of the film, and, in some embodiments, a Young's modulus of less than 550 MPa as measured in at least one direction. In some embodiments, the backing film has a coefficient of thermal expansion of not more than 91.8 ppm/° C. and a Young's modulus of not more than 540 MPa as measured in any direction within the plane of the film. In some embodiments, the core layer comprises a polyolefin, and skin layers comprise a thermoplastic elastomer.

10 Claims, 1 Drawing Sheet

(56) References Cited

U.S. PATENT DOCUMENTS

| | | | |
|---|---|---|---|
| 2006/0228480 A1 | 10/2006 | Lin | |
| 2007/0128396 A1 | 6/2007 | Sher | |
| 2007/0184736 A1 | 8/2007 | Sheitz | |
| 2007/0196610 A1 | 8/2007 | O'Rourke | |
| 2009/0008026 A1 | 1/2009 | Kopf | |
| 2009/0162674 A1 | 6/2009 | Boutwell | |
| 2009/0181250 A1 | 7/2009 | Zmarsly | |
| 2009/0186183 A1 | 7/2009 | Michel | |
| 2010/0307658 A1 | 12/2010 | Galush | |
| 2011/0048635 A1 | 3/2011 | Mussig | |
| 2011/0067799 A1 | 3/2011 | Mussig | |
| 2011/0094667 A1 | 4/2011 | Schulze | |
| 2011/0104488 A1 | 5/2011 | Mussig | |
| 2011/0120615 A1 | 5/2011 | Zmarsly | |
| 2011/0293871 A1 | 12/2011 | Storfer-Issar | |
| 2012/0029105 A1 | 2/2012 | Czerwonatis | |
| 2013/0089685 A1* | 4/2013 | Campeau | B32B 27/08 428/220 |
| 2013/0122288 A1 | 5/2013 | Miki | |
| 2013/0202886 A1 | 8/2013 | Gerst | |
| 2013/0323437 A1 | 12/2013 | Banba | |
| 2014/0090778 A1 | 4/2014 | Galoff | |
| 2014/0210143 A1 | 7/2014 | Berg | |
| 2014/0248487 A1 | 9/2014 | Sugimoto | |
| 2014/0259834 A1 | 9/2014 | Galoff | |
| 2014/0349094 A1* | 11/2014 | Jonza | B32B 5/18 428/215 |
| 2015/0050444 A1 | 2/2015 | Bernet | |
| 2015/0284599 A1 | 10/2015 | Kerep | |
| 2017/0348949 A1* | 12/2017 | Khurana | B32B 27/32 |
| 2019/0031923 A1* | 1/2019 | Khurana | C09J 7/29 |

FOREIGN PATENT DOCUMENTS

| | | |
|---|---|---|
| CN | 1197701 | 4/2005 |
| CN | 203582783 | 5/2014 |
| DE | 4222832 | 1/1994 |
| DE | 10212889 | 10/2003 |
| EP | 0109177 | 5/1984 |
| EP | 0121430 | 10/1984 |
| EP | 0193295 | 9/1986 |
| EP | 0215661 | 3/1987 |
| EP | 0259094 | 3/1988 |
| EP | 0301415 | 2/1989 |
| EP | 0393953 | 10/1990 |
| EP | 0508722 | 10/1992 |
| EP | 0638096 | 2/1995 |
| EP | 0704297 | 4/1996 |
| EP | 0725617 | 8/1996 |
| EP | 0736585 | 10/1996 |
| EP | 0739383 | 10/1996 |
| EP | 0759963 | 3/1997 |
| EP | 0776351 | 6/1997 |
| EP | 0820491 | 1/1998 |
| EP | 0852611 | 7/1998 |
| EP | 0857567 | 8/1998 |
| EP | 0886672 | 12/1998 |
| EP | 0951518 | 10/1999 |
| EP | 1021492 | 7/2000 |
| EP | 1029013 | 8/2000 |
| EP | 1068275 | 1/2001 |
| EP | 1091852 | 4/2001 |
| EP | 1112331 | 7/2001 |
| EP | 1123957 | 8/2001 |
| EP | 1165715 | 1/2002 |
| EP | 1192232 | 4/2002 |
| EP | 1263912 | 12/2002 |
| EP | 1267205 | 12/2002 |
| EP | 1169180 | 1/2003 |
| EP | 1309663 | 5/2003 |
| EP | 1321268 | 6/2003 |
| EP | 1321815 | 6/2003 |
| EP | 1358292 | 11/2003 |
| EP | 1373424 | 1/2004 |
| EP | 1376516 | 1/2004 |
| EP | 1394231 | 3/2004 |
| EP | 1434827 | 7/2004 |
| EP | 1569188 | 8/2005 |
| EP | 1648977 | 4/2006 |
| EP | 1341861 | 9/2006 |
| EP | 1712603 | 10/2006 |
| EP | 1717152 | 11/2006 |
| EP | 1719809 | 11/2006 |
| EP | 1792962 | 6/2007 |
| EP | 1800865 | 6/2007 |
| EP | 1871541 | 1/2008 |
| EP | 1928972 | 6/2008 |
| EP | 2016149 | 1/2009 |
| EP | 2049333 | 4/2009 |
| EP | 2226191 | 9/2010 |
| EP | 2363439 | 9/2011 |
| EP | 2403916 | 1/2012 |
| EP | 2425967 | 3/2012 |
| EP | 2425968 | 3/2012 |
| EP | 2426182 | 3/2012 |
| EP | 2426185 | 3/2012 |
| EP | 2439062 | 4/2012 |
| EP | 2474483 | 7/2012 |
| EP | 2716353 | 4/2014 |
| EP | 2734366 | 5/2014 |
| EP | 2734368 | 5/2014 |
| EP | 2799507 | 11/2014 |
| EP | 2874812 | 5/2015 |
| EP | 2895397 | 7/2015 |
| GB | 1327847 | 8/1973 |
| JP | 4376345 | 12/2009 |
| JP | 2014136746 | 7/2014 |
| WO | WO 1995-20633 | 8/1995 |
| WO | WO 1997-00922 | 1/1997 |
| WO | WO 1997-22675 | 6/1997 |
| WO | WO 2000-68336 | 11/2000 |
| WO | WO 2003-025530 | 3/2003 |
| WO | WO 2004-009348 | 1/2004 |
| WO | WO 2004-060674 | 7/2004 |
| WO | WO 2004-073967 | 9/2004 |
| WO | WO 2006-031468 | 3/2006 |
| WO | WO 2006-052698 | 5/2006 |
| WO | WO 2007-126620 | 11/2007 |
| WO | WO 2008-042397 | 4/2008 |
| WO | WO 2008-077729 | 7/2008 |
| WO | WO 2008-104439 | 9/2008 |
| WO | WO 2009-092643 | 7/2009 |
| WO | WO 2009-147098 | 12/2009 |
| WO | WO 2010-027507 | 3/2010 |
| WO | WO 2011-090603 | 7/2011 |
| WO | WO 2012-101045 | 8/2012 |
| WO | WO 2013-008077 | 1/2013 |
| WO | WO 2013-011195 | 1/2013 |
| WO | WO 2013-066971 | 5/2013 |
| WO | WO 2013-086014 | 6/2013 |
| WO | WO 2013-105377 | 7/2013 |
| WO | WO 2013-117428 | 8/2013 |
| WO | WO 2013-144443 | 10/2013 |
| WO | WO 2014-022673 | 2/2014 |
| WO | WO 2014-041239 | 3/2014 |
| WO | WO 2014-140056 | 9/2014 |
| WO | WO 2014-177754 | 11/2014 |
| WO | WO 2014-179675 | 11/2014 |
| WO | WO 2014-197368 | 12/2014 |
| WO | WO 2015-118210 | 8/2015 |
| WO | WO 2015-118211 | 8/2015 |
| WO | WO 2015-118212 | 8/2015 |
| WO | WO 2015-118213 | 8/2015 |
| WO | WO 2015-118214 | 8/2015 |
| WO | WO 2015-118215 | 8/2015 |
| WO | WO 2015-124786 | 8/2015 |
| WO | WO 2015-126931 | 8/2015 |

* cited by examiner

BACKING FOR ADHESIVE TAPE WITH THERMAL RESISTANCE

This application is a divisional application of U.S. patent application Ser. No. 16/042,192, filed 23 Jul. 2018, which claim the benefit of U.S. Provisional Application Ser. No. 62/537,042, filed 26 Jul. 2017, each of which in incorporated herein by reference in its entirety.

FIELD OF THE DISCLOSURE

This disclosure relates to backing films for adhesive tapes, in particular adhesive tapes used in construction such as seam sealing tapes, roofing tapes, and flashing tapes such as may be used around windows, doors, and other wall penetrations.

BACKGROUND OF THE DISCLOSURE

The following references may be relevant to the general field of technology of the present disclosure: US 2007/196610 A1, EP 2439062, US 2010/0307658 A1, CA 2159276 A1.

SUMMARY OF THE DISCLOSURE

Briefly, the present disclosure provides a backing film for an adhesive tape comprising: a) a core layer, having a first major surface opposite a second major surface, and having a core layer thickness of between 10.0 and 4,500 microns; and b) a first skin layer having a different composition from the core layer, having a first skin layer thickness of between 3.0 and 1,500 microns but not more than 50% of the core layer thickness, bonded directly to the first major surface of the core layer; where the backing film has a coefficient of thermal expansion of less than 90 ppm/° C. as measured in at least one direction within the plane of the film (e.g., down-web, cross-web, or some diagonal in between). In some embodiments, the backing film has a coefficient of thermal expansion of less than 79.2 ppm/° C. as measured in at least one direction within the plane of the film. In some embodiments, the backing film has a coefficient of thermal expansion of not more than 91.8 ppm/° C. as measured in any direction within the plane of the film. Additional embodiments are described below under "Selected Embodiments." In some embodiments, the backing film has a Young's modulus of less than 550 MPa as measured in at least one direction within the plane of the film. In some embodiments, the backing film has a Young's modulus of less than 470 MPa as measured in at least one direction within the plane of the film. In some embodiments, the backing film has a Young's modulus of not more than 540 MPa as measured in any direction within the plane of the film. Additional embodiments are described below under "Selected Embodiments." In some embodiments of the backing film, the core layer comprises a polyolefin, which in some embodiments may be a propylene/ethylene copolymer comprising propylene and ethylene in a weight ratio of at least 2:1 propylene/ethylene, at least 3:1 propylene/ethylene, or at least 4:1 propylene/ethylene. In some embodiments of the backing film, the first skin layer comprises a first thermoplastic elastomer, which in some embodiments may be a copolymer of ethylene, in some embodiments may be an ethylene vinyl acetate copolymer, and in some embodiments may be an ethylene methyl acrylate copolymer. The backing film may, in some embodiments, additionally comprise: c) a second skin layer having a different composition from the core layer, having a second skin layer thickness of between 3.0 and 1,500 microns but not more than 50% of the core layer thickness, bonded directly to the second major surface of the core layer. In some embodiments, the second skin layer has the same composition as the first skin layer, whereas in other embodiments the second skin layer has a different composition. Additional embodiments of the backing film of the present disclosure are described below under "Selected Embodiments."

In another aspect, the present disclosure provides an adhesive tape comprising any of the backing films presented herein. In some embodiments including a two-layer backing film, a pressure sensitive adhesive layer is bonded directly to the second major surface of the core layer. In some embodiments including a three-layer backing film, a pressure sensitive adhesive layer is bonded directly to the second skin layer on a surface opposite the core layer. In some embodiments, the pressure sensitive adhesive layer comprises at least 50 wt % of an acrylate resin. Additional embodiments of the adhesive tape of the present disclosure are described below under "Selected Embodiments."

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides backing films for adhesive tapes, in some embodiments including adhesive tapes used in construction as seam sealing tapes, roofing tapes, and flashing tapes such as may be used around windows, doors, and other wall penetrations. The present backing films may be used in manufacturing adhesive tapes which simultaneously demonstrate good tensile strength, tear resistance, slip resistance (static friction performance), ability to seal over nails with resistance to water penetration, resistance to wrinkling under hot weather conditions. In particular, tapes made using the backing films of the present disclosure demonstrate high resistance to wrinkling under hot weather conditions, while maintaining other characteristics desirable in adhesive tapes used in construction.

Figure 1:
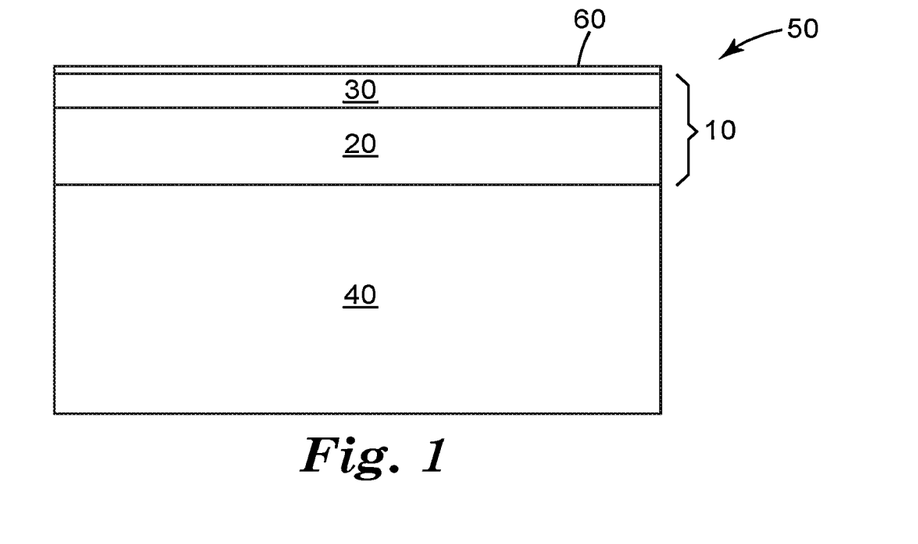
FIG. 1 is a cross-section of a tape according to the present disclosure that includes a two-layer (skin, core) backing film.

With reference to FIG. 1, some embodiments of backing film 10 comprise two layers: core layer 20 and skin layer 30. Backing film 10 may bear a layer of pressure sensitive adhesive 40 so as to comprise tape 50. In some embodiments, an optional low adhesion backsizing layer 60 is borne on the outermost surface of backing film 10.

Figure 2:
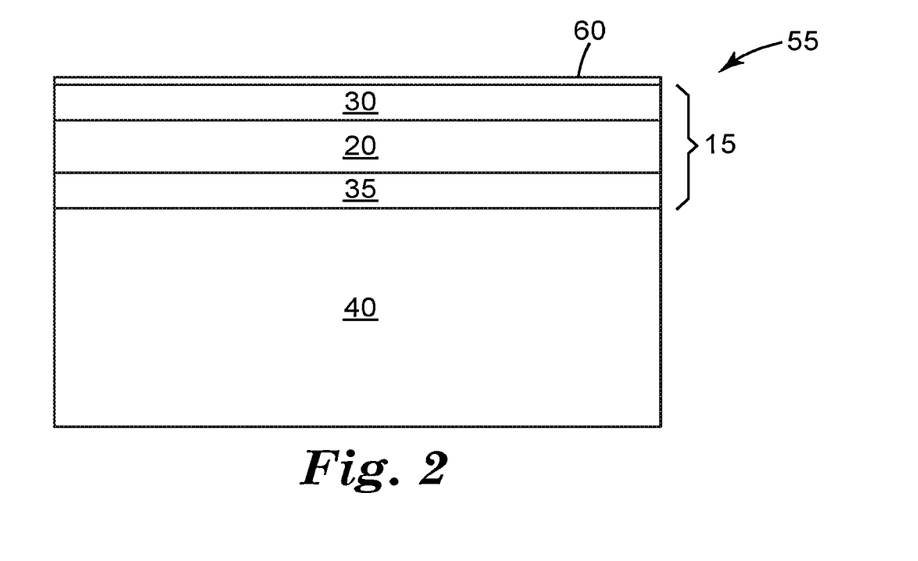
FIG. 2 is a cross-section of a tape according to the present disclosure that includes a three-layer (skin, core, skin) backing film.

With reference to FIG. 2, some embodiments of backing film 15 comprise three layers: core layer 20, first skin layer 30, and second skin layer 35. Backing film 15 may bear a layer of pressure sensitive adhesive 40 so as to comprise tape 55. In some embodiments, an optional low adhesion backsizing layer 60 is borne on the outermost surface of backing film 15. First skin layer 30 and second skin layer 35 may be of the same or different skin layer composition.

The backing film of the present disclosure has a reduced coefficient of thermal expansion, and in some embodiments, both a reduced coefficient of thermal expansion and a reduced Young's modulus. Without wishing to be bound by theory, it is believed that the reduced coefficient of thermal expansion contributes to the resistance to wrinkling under hot weather conditions demonstrated herein. In addition, since tapes are typically applied under mild tension, it is believed that a reduced Young's modulus allows the tape to stretch during application and thereafter reside on its substrate under tension, and thus heat expansion is less apt to put the tape into compression sufficient to result in wrinkles.

The core layer may be made of any suitable material. In some embodiments, the core layer principally comprises a polyolefin. In some embodiments, the polyolefin is a propylene/ethylene copolymer. In some embodiments, the core layer additionally comprises a pigment. In some embodiments, the core layer additionally comprises carbon black. In some embodiments, the core layer additionally comprises a UV stabilizer.

The skin layer(s) may be made of any suitable material. In some embodiments, the skin layer(s) principally comprise a thermoplastic elastomer. In some embodiments, the thermoplastic elastomer is a copolymer of ethylene. In some embodiments, the thermoplastic elastomer is an ethylene vinyl acetate copolymer. In some embodiments, the thermoplastic elastomer is an ethylene methyl acrylate copolymer.

The adhesive layer may be made of any suitable pressure sensitive adhesive. In some embodiments, the adhesive layer principally comprises an elastomeric resin. In some embodiments, the adhesive layer principally comprises an acrylate resin. In some embodiments, the adhesive layer additionally comprises a tackifier.

In some embodiments, the backing film is substantially opaque. In some such embodiments the backing film demonstrates a visible light transmission rate of less than 2%. In some embodiments, the backing film is at least partially transparent. In some such embodiments the backing film demonstrates a visible light transmission rate of greater than 15%, in others greater than 25%.

In some embodiments, the backing film may bear an additional thin layer of a low adhesion backsizing, such as a silicone coating or a coating of a polyvinyl octadecyl carbamate such as ESCOAT P-20.

The backing film may be made by any suitable method, including the two-layer embodiments and the three-layer embodiments. In some embodiments, the backing film may be made by blown film methods. In some embodiments, the backing film may be made by coating methods. Adhesive may be added by any suitable method. In some embodiments, adhesive may be added by coating methods.

Selected Embodiments

The following embodiments, designated by letter and number, are intended to further illustrate the present disclosure but should not be construed to unduly limit this disclosure.

A1. A backing film for an adhesive tape comprising:
  a) a core layer, having a first major surface opposite a second major surface, and having a core layer thickness of between 10.0 and 4,500 microns; and
  b) a first skin layer having a different composition from the core layer, having a first skin layer thickness of between 3.0 and 1,500 microns but not more than 50% of the core layer thickness, bonded directly to the first major surface of the core layer;
  wherein the backing film has a coefficient of thermal expansion of less than 90 ppm/° C. as measured in at least one direction within the plane of the film.

A2. The backing film according to any of the preceding embodiments, wherein the backing film has a coefficient of thermal expansion of less than 88.2 ppm/° C. as measured in at least one direction within the plane of the film.

A3. The backing film according to any of the preceding embodiments, wherein the backing film has a coefficient of thermal expansion of less than 86.4 ppm/° C. as measured in at least one direction within the plane of the film.

A4. The backing film according to any of the preceding embodiments, wherein the backing film has a coefficient of thermal expansion of less than 82.8 ppm/° C. as measured in at least one direction within the plane of the film.

A5 The backing film according to any of the preceding embodiments, wherein the backing film has a coefficient of thermal expansion of less than 79.2 ppm/° C. as measured in at least one direction within the plane of the film.

A6. The backing film according to any of the preceding embodiments, wherein the backing film has a coefficient of thermal expansion of less than 75.6 ppm/° C. as measured in at least one direction within the plane of the film.

A7. The backing film according to any of the preceding embodiments, wherein the backing film has a coefficient of thermal expansion of less than 72 ppm/° C. as measured in at least one direction within the plane of the film.

A8. The backing film according to any of the preceding embodiments, wherein the backing film has a coefficient of thermal expansion of not more than 99 ppm/° C. as measured in any direction within the plane of the film.

A9. The backing film according to any of the preceding embodiments, wherein the backing film has a coefficient of thermal expansion of not more than 95.4 ppm/° C. as measured in any direction within the plane of the film.

A10. The backing film according to any of the preceding embodiments, wherein the backing film has a coefficient of thermal expansion of not more than 91.8 ppm/° C. as measured in any direction within the plane of the film.

A11. The backing film according to any of the preceding embodiments, wherein the backing film has a coefficient of thermal expansion of not more than 88.2 ppm/° C. as measured in any direction within the plane of the film.

A12. The backing film according to any of the preceding embodiments, wherein the backing film has a coefficient of thermal expansion of not more than 84.6 ppm/° C. as measured in any direction within the plane of the film.

A13 The backing film according to any of the preceding embodiments, wherein the backing film has a coefficient of thermal expansion of not more than 82.8 ppm/° C. as measured in any direction within the plane of the film.

A14. The backing film according to any of the preceding embodiments, wherein the backing film has a Young's modulus of less than 550 MPa as measured in at least one direction within the plane of the film.

A15. The backing film according to any of the preceding embodiments, wherein the backing film has a Young's modulus of less than 510 MPa as measured in at least one direction within the plane of the film.

A16. The backing film according to any of the preceding embodiments, wherein the backing film has a Young's modulus of less than 470 MPa as measured in at least one direction within the plane of the film.

A17. The backing film according to any of the preceding embodiments, wherein the backing film has a Young's modulus of less than 430 MPa as measured in at least one direction within the plane of the film.

A18. The backing film according to any of the preceding embodiments, wherein the backing film has a Young's modulus of less than 390 MPa as measured in at least one direction within the plane of the film.

A19. The backing film according to any of the preceding embodiments, wherein the backing film has a Young's modulus of not more than 750 MPa as measured in any direction within the plane of the film.

A20. The backing film according to any of the preceding embodiments, wherein the backing film has a Young's modulus of not more than 680 MPa as measured in any direction within the plane of the film.

A21. The backing film according to any of the preceding embodiments, wherein the backing film has a Young's modulus of not more than 600 MPa as measured in any direction within the plane of the film.

A22. The backing film according to any of the preceding embodiments, wherein the backing film has a Young's modulus of not more than 540 MPa as measured in any direction within the plane of the film.

A23. The backing film according to any of the preceding embodiments, wherein the backing film has a Young's modulus of not more than 490 MPa as measured in any direction within the plane of the film.

A24. The backing film according to any of the preceding embodiments, wherein the backing film has a Young's modulus of not more than 440 MPa as measured in any direction within the plane of the film.

A25. The backing film according to any of the preceding embodiments, wherein the backing film has a Young's modulus of not more than 390 MPa as measured in any direction within the plane of the film.

A26. The backing film according to any of the preceding embodiments, wherein the core layer thickness is greater than 30 microns.

A27. The backing film according to any of the preceding embodiments, wherein the core layer thickness is greater than 55 microns.

A28. The backing film according to any of the preceding embodiments, wherein the core layer thickness is less than 2,000 microns.

A29. The backing film according to any of the preceding embodiments, wherein the core layer thickness is less than 700 microns.

A30. The backing film according to any of the preceding embodiments, wherein the core layer thickness is less than 270 microns.

A31. The backing film according to any of the preceding embodiments, wherein the core layer thickness is less than 120 microns.

A32. The backing film according to any of the preceding embodiments, wherein the first skin layer thickness is greater than 7 microns.

A33. The backing film according to any of the preceding embodiments, wherein the first skin layer thickness is greater than 11 microns.

A34. The backing film according to any of the preceding embodiments, wherein the first skin layer thickness is not more than 30% of the core layer thickness.

A35. The backing film according to any of the preceding embodiments, wherein the first skin layer thickness is not more than 20% of the core layer thickness.

A36. The backing film according to any of the preceding embodiments, wherein the core layer comprises at least 50 wt % of a polyolefin.

A37. The backing film according to any of the preceding embodiments, wherein the core layer comprises at least 60 wt % of a polyolefin.

A38. The backing film according to any of the preceding embodiments, wherein the core layer comprises at least 70 wt % of a polyolefin.

A39. The backing film according to any of the preceding embodiments, wherein the core layer comprises at least 75 wt % of a polyolefin.

A40. The backing film according to any of the preceding embodiments, wherein the core layer comprises at least 80 wt % of a polyolefin.

A41. The backing film according to any of the preceding embodiments, wherein the core layer comprises at least 85 wt % of a polyolefin.

A42. The backing film according to any of the preceding embodiments, wherein the core layer comprises at least 90 wt % of a polyolefin.

A43. The backing film according to any of the preceding embodiments, wherein the core layer comprises at least 95 wt % of a polyolefin.

A44. The backing film according to any of embodiments A36-A43, wherein the polyolefin is a propylene/ethylene copolymer comprising propylene and ethylene in a weight ratio of at least 2:1 propylene/ethylene.

A45. The backing film according to any of embodiments A36-A43, wherein the polyolefin is a propylene/ethylene copolymer comprising propylene and ethylene in a weight ratio of at least 3:1 propylene/ethylene.

A46. The backing film according to any of embodiments A36-A43, wherein the polyolefin is a propylene/ethylene copolymer comprising propylene and ethylene in a weight ratio of at least 4:1 propylene/ethylene.

A47. The backing film according to any of the preceding embodiments, wherein the first skin layer comprises at least 50 wt % of a first thermoplastic elastomer.

A48. The backing film according to any of the preceding embodiments, wherein the first skin layer comprises at least 60 wt % of a first thermoplastic elastomer.

A49. The backing film according to any of the preceding embodiments, wherein the first skin layer comprises at least 70 wt % of a first thermoplastic elastomer.

A50. The backing film according to any of the preceding embodiments, wherein the first skin layer comprises at least 75 wt % of a first thermoplastic elastomer.

A51. The backing film according to any of the preceding embodiments, wherein the first skin layer comprises at least 80 wt % of a first thermoplastic elastomer.

A52. The backing film according to any of the preceding embodiments, wherein the first skin layer comprises at least 85 wt % of a first thermoplastic elastomer.

A53. The backing film according to any of the preceding embodiments, wherein the first skin layer comprises at least 90 wt % of a first thermoplastic elastomer.

A54. The backing film according to any of the preceding embodiments, wherein the first skin layer comprises at least 95 wt % of a first thermoplastic elastomer.

A55. The backing film according to any of embodiments A47-A54, wherein the first thermoplastic elastomer is a copolymer of ethylene.

A56. The backing film according to any of embodiments A47-A54, wherein the first thermoplastic elastomer is an ethylene vinyl acetate copolymer.

A57. The backing film according to any of embodiments A47-A54, wherein the first thermoplastic elastomer is an ethylene methyl acrylate copolymer.

A58. The backing film according to any of the preceding embodiments, wherein the core layer additionally comprises a pigment.

A59. The backing film according to any of the preceding embodiments, wherein the core layer additionally comprises carbon black.

A60. The backing film according to any of the preceding embodiments, wherein the core layer additionally comprises a UV stabilizer.

B1. A backing film according to any of embodiments A1-A60, additionally comprising
  c) a second skin layer having a different composition from the core layer, having a second skin layer thickness of between 3.0 and 1,500 microns but not more than 50% of the core layer thickness, bonded directly to the second major surface of the core layer.

B2. The backing film according to embodiment B1, wherein the second skin layer thickness is greater than 7 microns.

B3. The backing film according to embodiment B1, wherein the second skin layer thickness is greater than 11 microns.

B4. The backing film according to any of embodiments B1-B3, wherein the second skin layer thickness is not more than 30% of the core layer thickness.

B5. The backing film according to any of embodiments B1-B3, wherein the second skin layer thickness is not more than 20% of the core layer thickness.

B6. The backing film according to any of embodiments B1-B5, wherein the second skin layer comprises at least 50 wt % of a thermoplastic elastomer.

B7. The backing film according to any of embodiments B1-B5, wherein the second skin layer comprises at least 60 wt % of a thermoplastic elastomer.

B8. The backing film according to any of embodiments B1-B5, wherein the second skin layer comprises at least 70 wt % of a second thermoplastic elastomer.

B9. The backing film according to any of embodiments B1-B5, wherein the second skin layer comprises at least 75 wt % of a second thermoplastic elastomer.

B10. The backing film according to any of embodiments B1-B5, wherein the second skin layer comprises at least 80 wt % of a second thermoplastic elastomer.

B11. The backing film according to any of embodiments B1-B5, wherein the second skin layer comprises at least 85 wt % of a second thermoplastic elastomer.

B12. The backing film according to any of embodiments B1-B5, wherein the second skin layer comprises at least 90 wt % of a second thermoplastic elastomer.

B13. The backing film according to any of embodiments B1-B5, wherein the second skin layer comprises at least 95 wt % of a second thermoplastic elastomer.

B14. The backing film according to any of embodiments B6-B13, wherein the second thermoplastic elastomer is a copolymer of ethylene.

B15. The backing film according to any of embodiments B6-B13, wherein the second thermoplastic elastomer is an ethylene vinyl acetate copolymer.

B16. The backing film according to any of embodiments B6-B13, wherein the second thermoplastic elastomer is an ethylene methyl acrylate copolymer.

B17. The backing film according to any of embodiments B1-B17, wherein the second skin layer has the same composition as the first skin layer.

T1. An adhesive tape comprising the backing film according to any of embodiments A1-A60 and a pressure sensitive adhesive layer bonded directly to the second major surface of the core layer.

T2. An adhesive tape comprising the backing film according to any of embodiments B1-B16 and a pressure sensitive adhesive layer bonded directly to the second skin layer on a surface opposite the core layer.

T3. An adhesive tape according to any of embodiments T1-T2 wherein the pressure sensitive adhesive layer comprises at least 50 wt % of an acrylate resin.

T4. An adhesive tape according to any of embodiments T1-T2 wherein the pressure sensitive adhesive layer comprises at least 80 wt % of an acrylate resin.

T5. An adhesive tape according to any of embodiments T1-T2 wherein the pressure sensitive adhesive layer comprises at least 90 wt % of an acrylate resin.

T6. An adhesive tape according to any of embodiments T1-T2 wherein the pressure sensitive adhesive layer comprises at least 95 wt % of an acrylate resin.

T7. An adhesive tape according to any of embodiments T1-T6 additionally comprising a low adhesion backsizing layer bonded directly to the first skin layer on a surface opposite the core layer.

M1. A method of sealing seams between panels in building construction, comprising the steps of:
  1) providing an adhesive tape according to any of embodiments T1-T7;
  2) applying the adhesive side of the tape to a seam.

M2. A method of sealing seams between panels in building construction, comprising the steps of:
  1) providing an adhesive tape according to any of embodiments T1-T7;
  2) applying the adhesive side of the tape to a seam while maintaining the tape in tension.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

All percentages and ratios are by weight, unless otherwise specified.

TABLE 1

Materials

| Designation | Description | Source |
| --- | --- | --- |
| X500F POLYPROP | A thermoplastic polyolefin, being a 90/10 propylene/ethylene copolymer, available under the trade designation "ADFLEX X500 F" | LyondellBasell Industries, N.V., Houston, TX |
| CARBON BLACK | A black polypropylene masterbatch (30 weight percent of carbon black in polypropylene), available under the trade designation "19370 BLACK PP MB" | Ampacet Corp., Tarrytown, NY |
| AMPACET 400943 | UV AO PP MB (10 weight percent of UV antioxidant in polypropylene), available under the trade designation "AMPACET 400943" | Ampacet Corp., Tarrytown, NY |
| BYNEL 3101 | An ethylene vinyl acetate (EVA) polymer adhesive resin available under the trade designation "BYNEL 3101 RESIN" | DuPont, Wilmington, DE |
| INFUSE 9507 | An olefin block copolymer available under the trade designation "INFUSE 9507 BLOCK COPOLYMER" | Dow, Midland, MI |
| ELVALOY 1609 | An ethylene and methyl acrylate copolymer available under the trade designation "ELVALOY 1609" | DuPont, Wilmington, DE |
| ANTIBLOCK 10063 | An anti-block masterbatch containing 20 weight percent of an anti-block agent in polyethylene, available under the trade designation "10063 ANTIBLOCK PE MB" | Ampacet Corp., Tarrytown, NY |
| R350 | Stabilizers, available under the trade designation "CYASORB CYNERGY SOLUTIONS R350 STABILIZER," used as a 7 wt % MB in X500 F. | CYTEC, Woodland Park, NJ |

Test Methods

Coefficient of Thermal Expansion Test

The coefficient of thermal expansion (CTE) of the test film was determined with a shrinkage tester device (Perbix Machine Co.) by heating the film at 76.7° C. for four minutes. Once the test was completed, the % length change was read from the instrument and recorded. CTE ($\alpha$) values were then calculated as follows:

$$\alpha = (\Delta L/L)/\Delta T$$

where, $\alpha$ is the coefficient of thermal expansion and reported as ppm/° C.

$\Delta L/L$ is recorded as % length change from the instrument $\Delta T$ is the change in temperature $\Delta T$ for this test was obtained using the difference in the room temperature and the measurement temperature; $\Delta T = 76.7 - 21.1 = 55.6°$ C.

Tensile Test

The tensile test was done according to ASTM D412-15a, 2016, including the following details. The material to be tested was conditioned at room temperature and humidity conditions 73.4±3.6° F. (23±2° C.) and 50±5% R.H. for at least 24 hours. Test specimens were die cut, using ASTM D412 dumbbell die "C" and arbor press or a heavy mallet with the longitudinal direction of the specimen aligned in the down-web direction. Each specimen was inspected by the naked eye, and any specimens with nicked or otherwise flawed edges in the "neck" area were discarded.

The thickness of each specimen was measured at three (3) locations in the "neck" area using a digital thickness gauge (e.g., a MITUTOYO DIGIMATIC INDICATOR) and the average thickness (to the nearest 0.001 inch (~25 micrometers)) was recorded. The ends of the sample were wrapped with 1 inch (~25 mm) wide 3M 202 tape (or a soft aluminum tape), leaving 2 to 2½ inches (~64 mm) in the center of the sample exposed.

The sample was aligned and clamped into the upper and lower jaws of an INSTRON, and the upper jaw of the INSTRON was started in motion at a crosshead speed of 20 inches/min. (50.8 cm/min.). Test conditions were 73.4° F.±3.6° F. (23° C.±2° C.) and 50±5% R.H. The sample was pulled rupture. Test results were discarded if the specimen ruptured outside of the "neck" area.

The tensile strength (lbs/inch width) and elongation (%) were obtained for each sample, and the average of all like samples, as provided by the TESTWORKS program. Tensile strength values were calculated as follows:

Tensile Strength (psi)=(load (pounds) at break)/ ((0.25 inch)*(thickness of the film in inches)). Tensile Strength is also reported in MPa.

Elongation values were calculated as follows:

Elongation (%)=(elongation (inches) at break/1.00 inch)×100

Young's Modulus values are reported in MPa.

Transmission Test

Visible light transmission values ("% T") were obtained using a HAZE-GARD PLUS haze meter (BYK-Gardiner, Silver Springs, Md.).

Elmendorf Tear Test

The Elmendorf tear test was carried out at constant temperature and humidity conditions using an ELMENDORF TEAR TESTER, with a 1600 gram range. Test samples were cut to 2.5 inches (~6.4 cm) by 2 to 3 inches (~5.1 cm to ~7.6 cm), and torn in the 2.5 inches direction. The tear line should occurred in the 2.5 inches direction (so the knife cut and tear added up to 2.5 inches). For downweb ("DW") tears, the tear line was in the DW direction, and the crossweb ("CD") tear line was in the CD direction. The number of layers was that number which gave the result closest to 40. The number of layers was a power of two (i.e., 1, 2, 4, 8, etc.). The layers were stacked making sure all the layers have the machine direction aligned in the same direction.

The ELMENDORF TEAR TESTER's pendulum was lifted until held in its raised or starting position by the pendulum stop. The test sample was placed securely in the jaws, making sure the bottom edge rested evenly on the bottom of the two jaws. The initial slit was made by pressing the handle of the knife blade. The length of the specimen left uncut above the jaws was 1.713+/−0.006 inch (4.351 cm±~0.02 cm). The pendulum stop was quickly depressed, making sure it did not rub on the pendulum while the tear was being made. The pendulum was stopped on the return swing without disturbing the position of the pointer. The reading indicated on the scale was recorded. If the tear line deviated more than 0.25 inch (0.64 cm) on either side of a vertical line starting at the initial slit, the results were discarded and the material retested.

Water Penetration Test

The testing was conducted using a test method in accordance with the International Code Council (ICC) Acceptance Criteria for Flexible Flashing Materials (AC-148) and the American Architectural Manufacturers Association document AAMA 711. The test method listed in AAMA 711 was a modified version of ASTM D1970/D1970M-15a with Section 5.2 of AAMA 711, with modifications described as follows. Linerless tape samples and other comparative samples were laminated to 6 inch by 6 inch (15 cm by 15 cm) piece of oriented strand ("OSB") boards. The samples were then rolled down with a hand roller and firm human pressure. Zinc galvanized roofing nails were then driven through the taped OSB 50 mm apart and to a depth of 3 mm UP from the board surface. The end of a 4 inch (100 mm) ID by 6 inch (150 mm) long section of polyvinyl chloride ("PVC") pipe was caulked and placed over the nail penetrations and sealed to the tape surface. The caulk was allowed to be fully cured for 24 h. The entire assembly was placed over the open top of a 1 gallon (~3.8 liters) paint can to capture any water leakage. A circular piece of filter paper was placed in the bottom of the 1 gallon can for positive leak detection. The PVC pipe was filled with red dyed water to a depth of 31 mm (1.2 in) and dwelled for 24 h at 40° F. (~4.4° C.). The resulting sample boards were then inspected for leaks. If no water was present on the filter paper, Nail Sealability=PASS; If water was present on the filter paper, Nail Sealability=FAILURE.

Examples 1 to 7 (EX-1 to EX-7)

For each of Examples 1 to 7, the film samples were produced on a three-layer spiral mandrel (2 inch (5.1 cm) mandrel) blown film die, using materials according to Table 2, to generate a two-layer construct of core and skin at the indicated thickness values. The feed to the three layer spiral mandrel was adjusted to obtain the airflow to achieve a blow up ratio of approximately 3.5:1. The resulting bubble was subsequently collapsed approximately 4 feet (1.2 m) above the die, and rolled up. The feed materials were supplied by two ¾" (19 mm) BRABENDER SINGLE SCREW EXTRUDERS (available from C.W. Brabender Instruments, 50 East Wesley Street, South Hackensack, N.J.) on the inside and outside layers, and one KILLION 1" (2.54 cm) SINGLE SCREW EXTRUDER (Davis-Standard, 1 Extrusion Drive, Pawcatuck, Conn.) on the center layer.

Process temperatures were as follows:
Outside, Center and Inside Skin Layers Extruder Temperatures: Zone 1: 360° F. (180° C.), Zone 2: 370° F. (188° C.), Zone 3: 380° F. (193° C.).
Adaptor temperature: 380° F. (193° C.); Die temperature: 380° F. (193° C.).

TABLE 2

Film Compositions

| ID# | Core | Core Thickness mil (micrometers) | Skin | Skin Thickness mil (micrometers) |
|---|---|---|---|---|
| EX-1 | X500F POLYPROP/CARBON BLACK/AMPACET 400943 (97/2/1) | 3.5 (89) | BYNEL 3101/ ANTIBLOCK 10063 (98/2) | 0.5 (13) |
| EX-2 | X500F POLYPROP/CARBON BLACK/AMPACET 400943 (97/2/1) | 3.5 (89) | INFUSE 9507/ ANTIBLOCK 10063 (98/2) | 0.5 (13) |
| EX-3 | X500F POLYPROP/CARBON BLACK/AMPACET 400943 (97/2/1) | 3.5 (89) | INFUSE 9507/X500F POLYPROP/ ANTIBLOCK 10063 (49/49/2) | 0.5 (13) |
| EX-4 | X500F POLYPROP/CARBON BLACK/AMPACET 400943 (97/2/1) | 3.5 (89) | ELVALOY 1609/ ANTIBLOCK 10063 (98/2) | 0.5 (13) |
| EX-5 | X500F POLYPROP/CARBON BLACK/R350 (97.5/0.5/2.0) | 3.5 (89) | BYNEL 3101/ ANTIBLOCK 10063 (98/2) | 0.5 (13) |
| EX-6 | X500F POLYPROP/CARBON BLACK/R350 (97.25/0.75/2.0) | 3.5 (89) | BYNEL 3101/ ANTIBLOCK 10063 (98/2) | 0.5 (13) |
| EX-7 | X500F POLYPROP/CARBON BLACK/R350 (97/1/2) | 3.5 (89) | BYNEL 3101/ ANTIBLOCK 10063 (98/2) | 0.5 (13) |
| EX-8 | X500F POLYPROP/CARBON BLACK/AMPACET 400943 (97.5/0.5/2.0) | 3.5 (89) | BYNEL 3101/ ANTIBLOCK 10063 (98/2) | 0.5 (13) |
| EX-9 | X500F POLYPROP/CARBON BLACK/AMPACET 400943 (96/2/2) | 3.5 (89) | BYNEL 3101/ ANTIBLOCK 10063 (98/2) | 0.5 (13) |
| CE-1 | X500F POLYPROP/CARBON BLACK/AMPACET 400943 (97/2/1) | 3.5 (89) | X500F POLYPROP/ ANTIBLOCK 10063 (98/2) | 0.5 (13) |

Examples 8 and 9 were produced on a BRAMPTON 9 LAYER BLOWN FILM system (available from Brampton Engineering, 8031 Dixie Rd, Brampton ON, Canada) using materials according to Table 2. The extrusion temperatures ranged from 340° F. (171° C.) to 380° F. (193° C.). Of the nine layers in the extrusion system, the two inside and outside extruders were 2.5" (6.4 cm) single screws with the remaining five center layers were fed with 2" (5.1 cm) single screws. A blow-up ratio of approximately 3:1 was used on the BRAMPTON 9 LAYER BLOWN FILM system. The resulting core and skin thickness values were as listed in Table 2.

Properties of the multilayer films of EX-1 to EX-9 were tested, with results as summarized in Table 3. To quantify the thermal resistance of the film backings, coefficient of thermal expansion ("CTE") was measured for both downweb ("DW") and crossweb ("CW") directions. Comparative Example 2 ("CE-2") was a backing film from a commercially available ZIPSYSTEM sealing tape. In Table 3, "ND" signifies "not determined".

TABLE 3

| ID# | CTE (ppm/° C.) DW | CTE (ppm/° C.) CW | Elmendorf Tear, grams DW | Elmendorf Tear, grams CW | Peak Load, lbf (N) DW | Peak Load, lbf (N) CW | % Elongation at break DW | % Elongation at break CW | Young's Modulus, MPa DW | Young's Modulus, MPa CW | Tensile Strength at break, psi (MPa) DW | Tensile Strength at break, psi (MPa) CW | % T |
|---|---|---|---|---|---|---|---|---|---|---|---|---|---|
| EX-1 | 69.7 | 79.5 | 359 | 536 | 3.271 (14.5) | 2.667 (11.9) | 1066 | 1015 | 561 | 495 | 2907 (20.0) | 2668 (18.4) | ND |
| EX-2 | 71.5 | 74.2 | 347 | 327 | 2.760 (12.3) | 2.846 (12.7) | 997 | 1126 | 583 | 441 | 2454 (16.9) | 2846 (19.6) | ND |
| EX-3 | 68.9 | 80.4 | 168 | 383 | 3.254 (14.5) | 2.887 (12.8) | 1188 | 1090 | 703 | 544 | 3254 (22.4) | 2887 (19.9) | ND |
| EX-4 | 73.4 | 82.7 | 221 | 443 | 3.204 (14.3) | 2.834 (12.6) | 1116 | 1095 | 708 | 531 | 3214 (22.2) | 2834 (19.5) | ND |
| EX-5 | 59.8 | ND | ND | ND | ND | ND | ND | ND | ND | ND | ND | ND | 50.5 |
| EX-6 | 49.6 | ND | ND | ND | ND | ND | ND | ND | ND | ND | ND | ND | 18.2 |
| EX-7 | 59.8 | ND | ND | ND | ND | ND | ND | ND | ND | ND | ND | ND | 16.0 |
| EX-8 | 71.4 | 86.4 | 277 | 287 | 3.768 (16.8) | 3.688 (16.4) | 1194 | 1275 | 456 | 382 | 3727 (25.7) | 3673 (25.3) | 33.6 |
| EX-9 | 74.6 | 82.6 | 237 | 265 | 3.573 (15.9) | 3.438 15.3) | 1156 | 1193 | 386 | 383 | 3516 (24.2) | 3383 (23.3) | 1.1 |
| CE-1 | 71.3 | 81.9 | 189 | 191 | 3.586 (16.0) | 3.129 (13.9) | 1096 | 1026 | 707 | 622 | 2988 (20.6) | 3129 (21.6) | ND |
| CE-2 | 129.9 | 136.4 | 211 | 212 | 4.233 (18.8) | 3.267 (14.5) | 1030 | 860 | 994 | 1086 | 3980 (27.4) | 3085 (21.3) | 1.0 |

Static Friction Performance

Several of the films were assessed for static friction performance, with results as summarized in Table 4. Static coefficient of friction was measured using an ARES-G2 rotational rheometer with a stainless steel ring-on-plate tribology fixture. The ring side of the fixture was coated with polyurethane in order to simulate a shoe material. For the testing procedure, the polyurethane and film started in contact with one another, using a fixed downward (axial) force. The film then started rotating relative to the ring, while torque on the ring was measured as a function of time. The torque could be converted to a friction force, dependent on the fixture geometry. The static coefficient of friction was reported as the first local maximum in friction force (directly after start-up) divided by the downward force. The test was conducted at 152.5 mm/s sliding speed.

TABLE 4

| ID# | Static Friction |
|---|---|
| EX-1 | Outstanding |
| EX-2 | Acceptable |
| EX-3 | Outstanding |
| EX-4 | Acceptable |
| EX-8 | Outstanding |
| EX-9 | Outstanding |

TABLE 4-continued

| ID# | Static Friction |
|---|---|
| CE-1 | Acceptable |
| CE-2 | Acceptable |

Example 10 (EX-10)

A sample of the film of Example 9 was coated on the core side with an 8 mil (~203 micrometers) thick adhesive layer of a cured monomer mixture containing 90 wt. % isooctyl acrylate and 10 wt. % acrylic acid. Following the Water Penetration Test procedure for nail sealability, the results were as summarized in Table 5. CE-3 was a commercially available ZIPSYSTEM sealing tape (available from Huber Engineered Woods, Charlotte, N.C.). CE-3 and EX-10 were applied to a construction panel and the panel was aged in an oven for 3 hours at 180° F. (82° C.). As noted in Table 5, sample CE-3 wrinkled and sample EX-10 did not wrinkle.

TABLE 5

| ID# | Nail Sealability | Wrinkling |
|---|---|---|
| EX-10 | Pass | Pass |
| CE-3 | Pass | Fail |

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. An adhesive tape comprising:
    a multilayer backing film comprising:
        a core layer having a first major surface opposite a second major surface and comprising a thermoplastic polyolefin having a thickness from 30 micrometers (μm) to 270 μm; and a skin layer bonded to the first major surface of the core layer and having a thickness greater than 7 μm and not more than 50% of the thickness of the core layer, wherein the skin layer comprises an ethylene vinyl acetate copolymer;

wherein the multilayer backing film has a thermal expansion coefficient of not more than 90 ppm/° C., a Young's modulus of less than 470 megaPascals (MPa) as measured in at least one direction within the plane of the film, and a Young's modulus of not more than 540 MPa as measured in any direction within the plane of the film; and a pressure sensitive adhesive layer bonded to the second major surface of the core layer, wherein the adhesive tape passes a water penetration test in accordance with the American Architectural Manufacturers Association ("AAMA") 711 document.

2. The tape of claim 1, wherein the skin layer has a composition different than that of the core layer.

3. The tape of claim 1, wherein the core layer has a thickness from 55 μm to 120 μm.

4. The tape of claim 1, wherein the skin layer has a thickness of greater than 11 μm.

5. The tape of claim 1, wherein the thermoplastic polyolefin in the core layer is a propylene/ethylene copolymer.

6. The tape of claim 5, wherein the propylene/ethylene copolymer comprises propylene and ethylene in a weight ratio of at least 2:1 propylene:ethylene.

7. The tape of claim 1, wherein the skin layer further comprises an ethylene methyl acrylate copolymer.

8. The tape of claim 1, wherein the pressure sensitive adhesive layer is 8 mil thick.

9. The tape of claim 1, wherein the pressure sensitive adhesive layer comprises at least 50% of an acrylate resin.

10. The tape of claim 1 further comprising a second skin layer having a composition different than that of the core layer and a second skin layer thickness of greater than 7 μm but not more than 50% of the core layer thickness, and wherein the second skin layer is bonded directly to the second major surface of the core layer.

* * * * *